(No Model.)

C. L. HALL.
HOSE COUPLING.

No. 549,510.  Patented Nov. 12, 1895.

Witnesses:
J. N. Fowler Jr.
Thomas Durant

Inventor:
Carrin L. Hall,
by Church & Church
Attorneys.

UNITED STATES PATENT OFFICE.

CASSIUS L. HALL, OF YPSILANTI, MICHIGAN, ASSIGNOR TO THE CLAYTON & LAMBERT MANUFACTURING COMPANY, OF SAME PLACE.

HOSE-COUPLING.

SPECIFICATION forming part of Letters Patent No. 549,510, dated November 12, 1895.

Application filed February 23, 1895. Serial No. 539,439. (No model.)

*To all whom it may concern:*

Be it known that I, CASSIUS L. HALL, of Ypsilanti, in the county of Washtenaw and State of Michigan, have invented certain new and useful Improvements in Hose-Couplings; and I do hereby declare the following to be a full, clear, and exact description of the same, reference being had to the accompanying drawings, forming a part of this specification, and to the letters of reference marked thereon.

This invention has for its object to provide a cheap and efficient coupling designed more especially for flexible hose, and which will enable the sections of hose to have a swiveling action, one upon the other, without leakage.

The invention consists in certain novel details of construction and combinations and arrangements of parts to be hereinafter described, and pointed out particularly in the appended claim.

Figure 1:
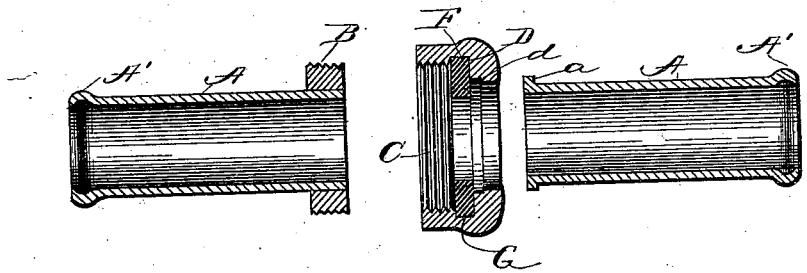
Figure 2:
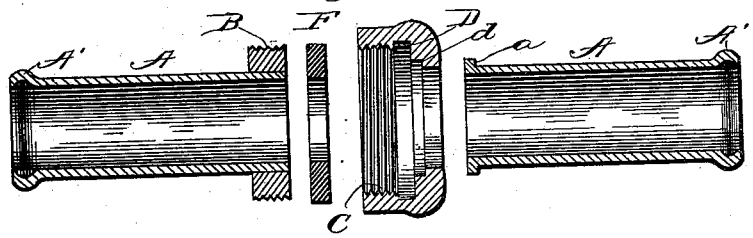
Figure 3:
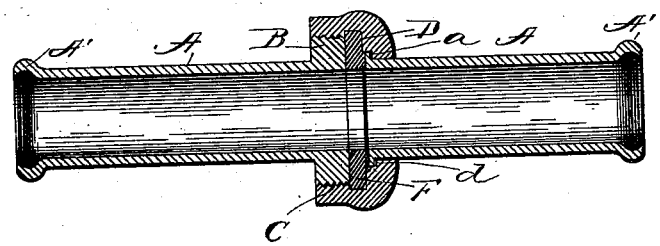

Referring to the accompanying drawings, Figure 1 is a section taken longitudinally through a hose-coupling constructed in accordance with my present invention with the parts separated. Fig. 2 is a similar view with the packing-ring removed. Fig. 3 is a similar view with the parts screwed together and with the externally-threaded section formed in one integral piece.

Like letters of reference in all the figures indicate the same parts.

The necks or portions of the coupling which are adapted to enter the hose or ends of the pipe to be coupled are in the present instance preferably constructed of seamless drawn tubing, as shown at A A in the drawings, and at the outer ends they have beads A' rolled or otherwise formed upon them to aid in retaining the necks within the ends of the pipe, it being understood, of course, that a suitable fastening device, such as a binding of wire, should be applied to the exterior of the pipe, as is usual in this class of devices. Upon the end of one of the necks is mounted or formed the external screw-threaded portion B, which is adapted to screw into a fly-nut C, swiveled on the other tubular neck.

In my coupling I propose, as before stated, not only to provide a tight coupling, but also to provide for a swiveling action of the parts, and in order to accomplish this in the most efficient manner and to prevent binding when the parts are screwed tightly together I provide an anvil or shoulder portion D in the fly-nut, against which the pressure from the entering end is exerted, and at the inner edge of this shoulder I provide a recess $d$ for the reception of the outwardly-flanged edge $a$ of the neck portion. This recess is of such depth that the end of the neck portion will lie flush with or below the surface of the shoulder D, the result being that should the entering end be screwed down without the interposition of a washer little or no pressure would be brought to bear on the end of the swivel-neck, and in order to secure a perfectly water-tight joint I interpose an elastic gasket or washer F having an internal diameter approximately corresponding to the internal diameter of the swivel-neck against which washer or gasket the entering end presses, the pressure which is exerted against the swivel-neck, however, being entirely due to the elasticity of the gasket itself, which, together with the external pressure in the pipe, is sufficient to maintain a water-tight joint, while permitting of the desirable swiveling action before referred to.

In all devices of this kind and, especially such as are adapted for use in hand hose-pipe, there is great liability of the gasket becoming lost, it being a very common matter to find that a perfect joint cannot be made because the gasket has dropped out, and with a view to overcoming this evil I now cut an annular groove or recess G in the fly-nut of a width corresponding to the thickness of the gasket and in such position that its inner side forms a continuation of the anvil or shoulder D. The washer or gasket is of a diameter corresponding to the largest diameter of the annular recess G, and when forced into place it is held against all danger of accidental escape, the result being that the parts are always in condition to form the water-tight joint.

Obviously instead of making the externally-threaded neck-piece of seamless tubing, with the threaded portion applied thereto, the two portions may be cast or formed integral, as shown, for instance, in Fig. 3; but I prefer to make both necks of seamless tubing and with but a single bead at the end for the attachment of the hose-pipe, as this construction is found to be very cheap and highly efficient in that the hose-pipe may be easily and quickly applied and when in place is easily secured by a simple wire or other wrapping around the exterior.

Having thus described my invention, what I claim as new is—

In a coupling of the character described, the combination with the externally threaded neck and swivel neck having the external flange, of the fly nut for uniting the two having the internally threaded aperture, the enlarged annular recess with the anvil or shoulder extending inwardly beyond the line of the screw-threaded aperture and the recess in the edge of said anvil or shoulder for the reception of the external flange on the swivel neck and an elastic gasket held in the annular recess and having its internal diameter corresponding approximately to the internal diameter of the necks; substantially as described.

CASSIUS L. HALL.

Witnesses:
 W. C. DINES,
 JNO. B. DEMPSEY.